United States Patent
Sugitani et al.

(10) Patent No.: US 10,115,394 B2
(45) Date of Patent: Oct. 30, 2018

(54) APPARATUS AND METHOD FOR DECODING TO RECOGNIZE SPEECH USING A THIRD SPEECH RECOGNIZER BASED ON FIRST AND SECOND RECOGNIZER RESULTS

(71) Applicant: MITSUBISHI ELECTRIC CORPORATION, Tokyo (JP)

(72) Inventors: Naoya Sugitani, Tokyo (JP); Yohei Okato, Tokyo (JP); Michihiro Yamazaki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/302,576

(22) PCT Filed: Jul. 8, 2014

(86) PCT No.: PCT/JP2014/068191
§ 371 (c)(1),
(2) Date: Oct. 7, 2016

(87) PCT Pub. No.: WO2016/006038
PCT Pub. Date: Jan. 14, 2016

(65) Prior Publication Data
US 2017/0140752 A1    May 18, 2017

(51) Int. Cl.
*G10L 15/10* (2006.01)
*G10L 15/32* (2013.01)
(Continued)

(52) U.S. Cl.
CPC .............. *G10L 15/10* (2013.01); *G10L 15/01* (2013.01); *G10L 15/065* (2013.01); *G10L 15/32* (2013.01)

(58) Field of Classification Search
CPC ......... G10L 15/28; G10L 15/30; G10L 15/32; G10L 15/10
(Continued)

(56) References Cited

U.S. PATENT DOCUMENTS 5,712,957 A * 1/1998 Waibel ..................... G06K 9/03
704/240
5,893,058 A   4/1999 Kosaka
(Continued)

FOREIGN PATENT DOCUMENTS

CN    102138175 A    7/2011
CN    103650034 A    3/2014
(Continued)

OTHER PUBLICATIONS

Schwenk, Holger, et al. "Combining multiple speech recognizers using voting and language model information." Interspeech. Oct. 2000, pp. 915-918.*

(Continued)

*Primary Examiner* — James Wozniak
(74) *Attorney, Agent, or Firm* — Birch, Stewart, Kolasch & Birch, LLP (57) ABSTRACT

An object is to provide a technique which can provide a highly valid recognition result while preventing unnecessary processing. A voice recognition device includes first to third voice recognition units, and a control unit. When it is decided based on recognition results obtained by the first and second voice recognition units to cause the third voice recognition unit to recognize an input voice, the control unit causes the third voice recognition unit to recognize the input voice by using a dictionary including a candidate character string obtained by at least one of the first and second voice recognition units.

9 Claims, 8 Drawing Sheets (51) Int. Cl.
*G10L 15/01* (2013.01)
*G10L 15/065* (2013.01)

(58) Field of Classification Search
USPC .............................................. 704/251, 270.1
See application file for complete search history.

(56) References Cited

U.S. PATENT DOCUMENTS

| | | | |
|---|---|---|---|
| 6,922,669 B2 * | 7/2005 | Schalk | G10L 15/18 704/243 |
| 8,355,920 B2 * | 1/2013 | Gopinath | G10L 15/22 704/235 |
| 8,364,481 B2 | 1/2013 | Strope et al. | |
| 8,484,031 B1 * | 7/2013 | Yeracaris | G10L 15/30 704/270.1 |
| 8,571,860 B2 | 10/2013 | Strope et al. | |
| 9,373,329 B2 | 6/2016 | Strope et al. | |
| 2003/0115053 A1 * | 6/2003 | Eide | G10L 15/32 704/231 |
| 2003/0120486 A1 * | 6/2003 | Brittan | G10L 15/32 704/231 |
| 2003/0125948 A1 * | 7/2003 | Lyudovyk | G10L 15/183 704/257 |
| 2004/0138885 A1 * | 7/2004 | Lin | G10L 15/32 704/240 |
| 2005/0108012 A1 * | 5/2005 | Roth | G10L 15/08 704/252 |
| 2006/0009980 A1 * | 1/2006 | Burke | G10L 15/32 704/270 |
| 2006/0020464 A1 * | 1/2006 | Ju | G10L 15/08 704/257 |
| 2007/0271086 A1 * | 11/2007 | Peters | G06F 17/211 704/9 |
| 2008/0162137 A1 * | 7/2008 | Saitoh | G10L 15/22 704/251 |
| 2008/0208577 A1 * | 8/2008 | Jeong | G10L 15/32 704/231 |
| 2008/0228482 A1 * | 9/2008 | Abe | G10L 17/00 704/249 |
| 2008/0243515 A1 * | 10/2008 | Odinak | G10L 15/193 704/270.1 |
| 2009/0089236 A1 * | 4/2009 | Lamprecht | G10L 15/26 706/46 |
| 2009/0100050 A1 * | 4/2009 | Erol | G06F 17/30026 |
| 2009/0182559 A1 * | 7/2009 | Gerl | G10L 15/08 704/235 |
| 2010/0004930 A1 | 1/2010 | Strope et al. | |
| 2010/0082343 A1 * | 4/2010 | Levit | G10L 15/32 704/257 |
| 2010/0138215 A1 * | 6/2010 | Williams | G10L 15/22 704/9 |
| 2011/0166855 A1 * | 7/2011 | Vermeulen | G10L 15/32 704/231 |
| 2012/0215539 A1 * | 8/2012 | Juneja | G10L 15/30 704/254 |
| 2013/0132086 A1 * | 5/2013 | Xu | G10L 15/01 704/257 |
| 2013/0138440 A1 | 5/2013 | Strope et al. | |
| 2013/0144597 A1 * | 6/2013 | Waibel | G06F 17/28 704/2 |
| 2014/0058728 A1 | 2/2014 | Strope et al. | |
| 2014/0100847 A1 | 4/2014 | Ishii et al. | |
| 2014/0129218 A1 * | 5/2014 | Liu | G10L 15/32 704/231 |
| 2014/0163977 A1 * | 6/2014 | Hoffmeister | G10L 15/32 704/232 |
| 2014/0223310 A1 * | 8/2014 | Divay | G10L 15/22 715/727 |
| 2014/0288932 A1 * | 9/2014 | Yeracaris | G10L 15/30 704/249 |
| 2016/0275951 A1 | 9/2016 | Strope et al. | |
| 2017/0140752 A1 * | 5/2017 | Sugitani | G10L 15/10 |

FOREIGN PATENT DOCUMENTS

| | | |
|---|---|---|
| JP | 2-195400 A | 8/1990 |
| JP | 6-83388 A | 3/1994 |
| JP | 2004-138914 A | 5/2004 |
| JP | 2005-3997 A | 1/2005 |
| JP | 2008-89625 A | 4/2008 |
| JP | 2008-197356 A | 8/2008 |

OTHER PUBLICATIONS

Office Action dated Jul. 28, 2017 in corresponding Chinese Application No. 201480080290.3 with an English Translation.
Office Action dated Nov. 24, 2017 in corresponding German Application No. 11 2014 006 795.4 with an English translation.
Office Action dated Jan. 9, 2018 in corresponding Chinese Application No. 201480080290.3 with an English Translation.

* cited by examiner

| CANDIDATE CHARACTER STRING | SCORE VALUE |
|---|---|
| CANDIDATE CHARACTER STRING C | 1000 |
| CANDIDATE CHARACTER STRING A | 900 |
| CANDIDATE CHARACTER STRING B | 800 |
| CANDIDATE CHARACTER STRING D | 700 |
| CANDIDATE CHARACTER STRING F | 600 |
| CANDIDATE CHARACTER STRING E | 500 |

FIG. 4B

| CANDIDATE CHARACTER STRING | SCORE VALUE |
|---|---|
| CANDIDATE CHARACTER STRING A | 10000 |
| CANDIDATE CHARACTER STRING B | 9000 |
| CANDIDATE CHARACTER STRING C | 8000 |
| CANDIDATE CHARACTER STRING G | 7000 |
| CANDIDATE CHARACTER STRING E | 6000 |
| CANDIDATE CHARACTER STRING F | 5000 |

FIG. 4C

| CANDIDATE CHARACTER STRING |
|---|
| CANDIDATE CHARACTER STRING C |
| CANDIDATE CHARACTER STRING A |
| CANDIDATE CHARACTER STRING B |
| CANDIDATE CHARACTER STRING F |
| CANDIDATE CHARACTER STRING E |

FIG. 4D

| CANDIDATE CHARACTER STRING |
|---|
| CANDIDATE CHARACTER STRING A |
| CANDIDATE CHARACTER STRING C |
| CANDIDATE CHARACTER STRING B |
| CANDIDATE CHARACTER STRING F |
| CANDIDATE CHARACTER STRING E |

FIG. 4E

| CANDIDATE CHARACTER STRING |
|---|
| CANDIDATE CHARACTER STRING A |
| CANDIDATE CHARACTER STRING B |
| CANDIDATE CHARACTER STRING C |
| CANDIDATE CHARACTER STRING F |
| CANDIDATE CHARACTER STRING E |

FIG. 4F

| CANDIDATE CHARACTER STRING |
|---|
| CANDIDATE CHARACTER STRING A |
| CANDIDATE CHARACTER STRING B |
| CANDIDATE CHARACTER STRING C |
| CANDIDATE CHARACTER STRING E |
| CANDIDATE CHARACTER STRING F |

| CANDIDATE CHARACTER STRING | SCORE VALUE (UPPER LIMIT VALUE 1000, FIRST THRESHOLD 500) |
|---|---|
| CANDIDATE CHARACTER STRING A | 300 |
| CANDIDATE CHARACTER STRING B | 200 |
| CANDIDATE CHARACTER STRING C | 100 |
| CANDIDATE CHARACTER STRING D | 100 |

FIG. 6B

| CANDIDATE CHARACTER STRING | SCORE VALUE (UPPER LIMIT VALUE 10000, SECOND THRESHOLD 5000) |
|---|---|
| CANDIDATE CHARACTER STRING A | 4000 |
| CANDIDATE CHARACTER STRING B | 3000 |
| CANDIDATE CHARACTER STRING C | 2000 |
| CANDIDATE CHARACTER STRING D | 1000 |

FIG. 7A

| CANDIDATE CHARACTER STRING |
|---|
| CANDIDATE CHARACTER STRING A |
| CANDIDATE CHARACTER STRING B |
| CANDIDATE CHARACTER STRING C |
| CANDIDATE CHARACTER STRING D |
| CANDIDATE CHARACTER STRING E |
| CANDIDATE CHARACTER STRING F |

FIG. 7B

| CANDIDATE CHARACTER STRING |
|---|
| CANDIDATE CHARACTER STRING A |
| CANDIDATE CHARACTER STRING B |
| CANDIDATE CHARACTER STRING C |
| CANDIDATE CHARACTER STRING D |
| CANDIDATE CHARACTER STRING G |

APPARATUS AND METHOD FOR DECODING TO RECOGNIZE SPEECH USING A THIRD SPEECH RECOGNIZER BASED ON FIRST AND SECOND RECOGNIZER RESULTS

TECHNICAL FIELD

The present invention relates to a voice recognition apparatus and a voice recognition method which perform recognition of voice to be outputted from an output unit.

BACKGROUND ART

A voice recognition technique used for conventional voice recognition devices is specialized according to a recognition rate, a computation amount and hardware resources. Voice recognition for the purpose of this technique refers to identification, recognition and understanding of speech. For example, an in-vehicle voice recognition device adopts voice recognition (local recognition) specialized for vehicles, and has advantages of high noise resistance and responsivity. Further, for example, a voice recognition device of a server which recognizes voice data received from an outside via a network adopts voice recognition (server recognition) specialized for serves. This voice recognition device has advantages that it is possible to use a dictionary including multiple or new vocabularies and to recognize voices with a high computation amount.

In this regard, in recent years, for reasons of diversification of usages, a configuration where local recognition and server recognition are combined to provide both of the advantages has been studied. However, according to a configuration which uses a plurality of voice recognition units, recognition methods of respective voice recognition engines are different, and dictionaries for recognition (recognition dictionaries) of respective voice recognition engines are different. Therefore, there is a problem that it is not possible to simply compare respective recognition results.

More specifically, each of a plurality of voice recognition units determines a candidate character string corresponding to an input voice (a character string such as a vocabulary which is highly likely to match the input voice) as a voice recognition result. Each voice recognition unit calculates a score value indicating accuracy of each candidate character string (a probability that each candidate character string matches with the input voice). However, when score values for some candidate character strings are different between a plurality of voice recognition units, there is a problem that it is not possible to simply compare score values between a plurality of voice recognition units.

Hence, various techniques have been proposed for this problem. For example, Patent Document 1 proposes a technique of statistically processing score values which are different between a plurality of voice recognition units, normalizing the score values to score values which can be compared between a plurality of voice recognition units, and outputting a candidate character string of the highest score value as an entire recognition result.

Further, for example, Patent Document 2 proposes a technique of causing a first voice recognition unit to recognize an input voice by using a plurality of recognition dictionaries, storing candidate character strings of higher score values which are voice recognition results, in a secondary decision dictionary, and causing a second voice recognition unit to recognize an input voice by using the secondary decision dictionary.

PRIOR ART DOCUMENTS

Patent Documents

Patent Document 1: Japanese Patent Application Laid-Open No. 2005-003997
Patent Document 2: Japanese Patent Application Laid-Open No. 2008-197356

SUMMARY OF INVENTION

Problems to be Solved by the Invention

As described above, according to the technique disclosed in Patent Document 1, score values which are different between a plurality of voice recognition units are statistically processed and are normalized to score values which can be compared between a plurality of voice recognition units. However, when, for example, there are multiple candidate character strings for which the score values different between a plurality of voice recognition units have been calculated, there is a problem that the score values cannot be sufficiently normalized to enable adequate comparison, and thus it is not possible to obtain a highly valid recognition result.

Further, the technique disclosed in Patent Document 2 has a problem that, even when a sufficiently accurate result is obtained at a first stage of voice recognition, a second stage of voice recognition is also performed, which causes unnecessary processing.

The present invention has been made in light of the above problems, and it is therefore an object of the present invention to provide a technique which can provide a highly valid recognition result while preventing unnecessary processing.

Means for Solving the Problems

A voice recognition apparatus according to the present invention is a voice recognition apparatus which performs recognition of voice to be outputted from an output unit and includes: first, second and third voice recognition units which recognize an input voice and obtain recognition results including candidate character strings corresponding to the input voice; and a control unit which, when it is decided based on the recognition results obtained by the first and second voice recognition units to cause the third voice recognition unit to recognize the input voice, causes the third voice recognition unit to recognize the input voice by using a dictionary including the candidate character string obtained by at least one of the first and second voice recognition units, and causes the output unit to output the recognition result obtained by the recognition.

Further, a voice recognition method according to the present invention is a voice recognition method for performing recognition of voice to be outputted from an output unit and includes, when it is decided based on recognition results obtained by first and second voice recognition units among first, second and third voice recognition units which recognize an input voice and obtain the recognition results including candidate character strings corresponding to the input voice, to cause the third voice recognition unit to recognize the input voice, causing the third voice recognition unit to recognize the input voice by using a dictionary including the candidate character string obtained by at least one of the first and second voice recognition units, and causing the output unit to output the recognition result obtained by the recognition.

Effects of the Invention

According to the present invention, it is possible to obtain a highly valid recognition result while preventing unnecessary processing.

Objects, features, aspects and advantages of the present invention will become more apparent from the following detailed description and the accompanying drawings.

DESCRIPTION OF EMBODIMENTS

<First Embodiment>

A case where a voice recognition system according to the present invention is applied to a voice recognition device 1 alone will be mainly described as an example below.

Figure 1:
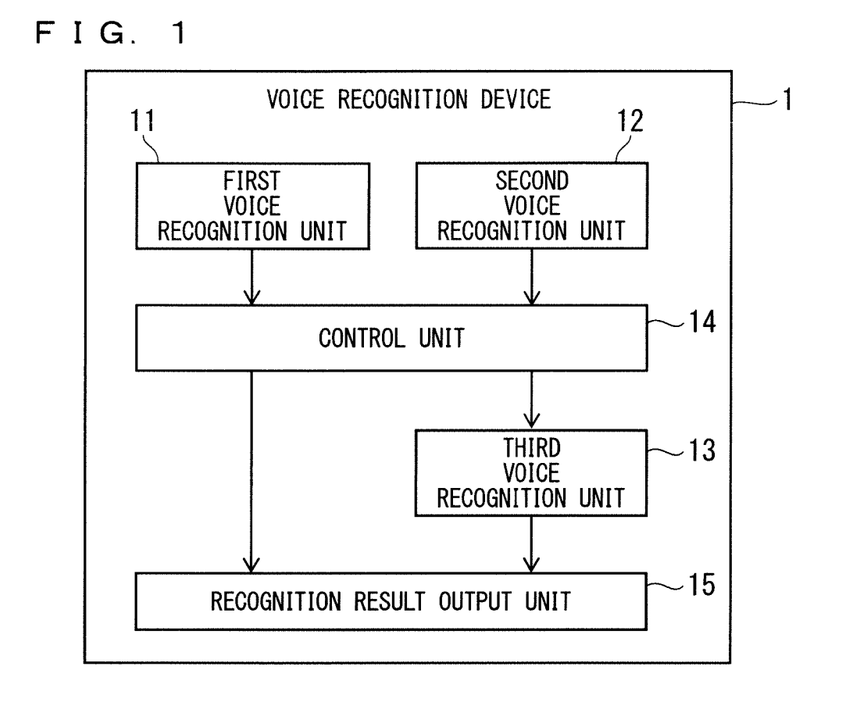
FIG. 1 is a block diagram illustrating main components of a voice recognition device according to a first embodiment.

FIG. 1 is a block diagram illustrating main components of a voice recognition device 1 according to the first embodiment of the present invention. The voice recognition device 1 in FIG. 1 includes a first voice recognition unit 11, a second voice recognition unit 12, a third voice recognition unit 13, a control unit 14 and a recognition result output unit 15.

The voice recognition device 1 in FIG. 1 performs recognition of voice to be outputted from the recognition result output unit 15 which is an output unit. The recognition result output unit 15 may be, for example, an output terminal which outputs to another device a recognition result obtained by voice recognition, or may be a display device which displays a recognition result or may be a voice output device which outputs a voice of a recognition result. Although the recognition result output unit 15 is provided in the voice recognition device 1 according to the configuration in FIG. 1, when the recognition result output unit 15 is a display device or a voice output device, the recognition result output unit 15 may be provided to another device without being provided to the voice recognition device 1.

The first to third voice recognition units 11 to 13 each include a storage device such as a semiconductor memory which stores, for example, a dictionary including a plurality of vocabularies, words and document, and a program, and a function realized by a processor such as a central processing unit (referred to as a "CPU" below) executing the program. The first to third voice recognition units 11 to 13 configured as described each recognize an input voice to obtain (generate) a recognition result including a candidate character string corresponding to the input voice (a character string such as a vocabulary, a word or document which is highly likely to match the input voice).

Figure 2:
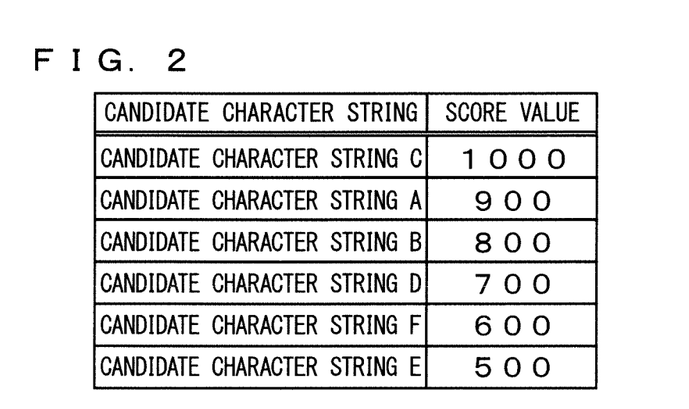
FIG. 2 is a view illustrating an example of an input voice recognition result according to the first embodiment.

FIG. 2 is a view illustrating an example of recognition results obtained by the first to third voice recognition units 11 to 13. In the first embodiment, the recognition results of the first to third voice recognition units 11 to 13 include not only candidate character strings but also score values indicating accuracy of each candidate character string (a probability that each candidate character string matches an input voice). Hereinafter, it is assumed that, for example, a higher score value provides higher accuracy of a candidate character string.

The control unit 14 is realized by, for example, the processor such as the CPU executing a program stored in the storage device. When it is decided based on the recognition results obtained by the first and second voice recognition units 11 and 12 to cause the third voice recognition unit 13 to recognize an input voice, the control unit 14 causes the third voice recognition unit 13 to recognize the input voice by using a dictionary including the candidate character strings obtained by the first and second voice recognition units 11 and 12, and causes the recognition result output unit 15 to output the resulting recognition result.

Whether or not to cause the third voice recognition unit 13 to recognize a voice may be decided by the voice recognition device 1 or may be decided by an external device of the voice recognition device 1 by giving the recognition results obtained by the first and second voice recognition units 11 and 12 to this external device.

According to the voice recognition device 1 according to the first embodiment described above, the third voice recognition unit 13 recognizes an input voice by using a dictionary including candidate character strings obtained by the first and second voice recognition units 11 and 12. Consequently, even when, for example, score values of the candidate character strings obtained by the first and second voice recognition units 11 and 12 vary to such a degree that the score values cannot be compared, the third voice recognition unit 13 can calculate a score value whose criterion is standardized for the candidate character strings. That is, it is possible to substantially normalize the score values of the first and second voice recognition units 11 and 12 and, consequently, obtain a highly valid recognition result.

Further, when it is decided based on the recognition results obtained by the first and second voice recognition units 11 and 12 to cause the third voice recognition unit 13 to recognize an input voice, the control unit 14 causes the third voice recognition unit 13 to recognize an input voice. Consequently, even when the recognition results of the first and second voice recognition units 11 and 12 do not completely match to each other yet are similar, i.e., when it is difficult to clearly decide which one of the recognition results of the first and second voice recognition units 11 and 12 is appropriate, it is possible to cause the third voice recognition unit 13 to recognize an input voice. Consequently, it is possible to prevent the third voice recognition unit 13 from performing voice recognition more than necessary and, consequently, prevent unnecessary processing.

Next, not only the main components of the voice recognition device 1 but also additional components will be described. In this regard, the following contents are an example of the above contents, and the present invention is not limited to the following contents.

Figure 3:
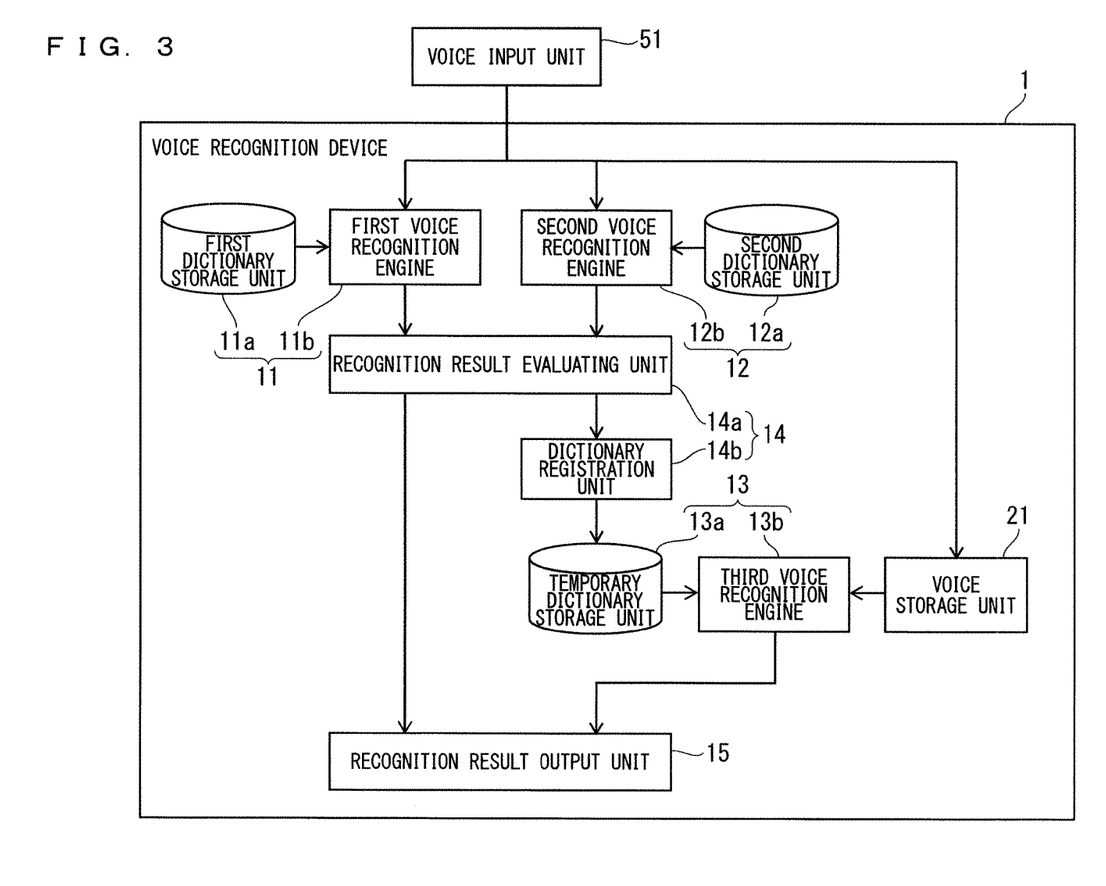
FIG. 3 is a block diagram illustrating a configuration of the voice recognition device according to the first embodiment.

FIG. 3 is a block diagram illustrating the main components and the additional components of the voice recognition device 1 according to the first embodiment.

The voice recognition device 1 is connected with a voice input unit 51. The voice input unit 51 is configured as a microphone, for example, and receives a voice uttered by a user. The voice input unit 51 outputs the received voice as an input voice to the first and second voice recognition units 11 and 12 and a voice storage unit 21.

The voice storage unit 21 temporarily stores the input voice received from the voice input unit 51. For example, the voice storage unit 21 stores the input voice received from the voice input unit 51 until an input voice is received from the voice input unit 51 next.

The first voice recognition unit 11 includes a first dictionary storage unit 11a and a first voice recognition engine 11b. Similarly, the second voice recognition unit 12 includes a second dictionary storage unit 12a and a second voice recognition engine 12b, and the third voice recognition unit 13 includes a temporary dictionary storage unit 13a and a third voice recognition engine 13b.

The first and second dictionary storage units 11a and 12a and the temporary dictionary storage unit 13a are each configured as a storage device such as a semiconductor memory. The first to third voice recognition engines 11b, 12b and 13b are realized by, for example, the processor executing a program including a voice recognition algorithm (e.g. hidden Markov model).

Next, the first dictionary storage unit 11a and the first voice recognition engine 11b of the first voice recognition unit 11 will be described in detail.

In the first dictionary storage unit 11a, the dictionary including a plurality of vocabularies, words or document is stored. The first voice recognition engine 11b recognizes an input voice received from the voice input unit 51 by using the dictionary of the first dictionary storage unit 11a. More specifically, the first voice recognition engine 11b determines a candidate character string (FIG. 2) corresponding to the input voice from vocabularies, words or document included in the dictionary of the first dictionary storage unit 11a, and calculates a score value of the candidate character string (FIG. 2). Further, the first voice recognition engine 11b outputs a recognition result including the candidate character string and the score value, to the control unit 14 (recognition result evaluating unit 14a).

The second dictionary storage unit 12a and the second voice recognition engine 12b of the second voice recognition unit 12 also employ the same configuration as those of the first dictionary storage unit 11a and the first voice recognition engine 11b. In this regard, the second voice recognition unit 12 is configured not to perform the same voice recognition as that of the first voice recognition unit 11. This is because the same recognition result of the same input voice can only be obtained, if the second voice recognition unit 12 performs the completely same voice recognition as that of the first voice recognition unit 11.

A configuration where the first and second voice recognition units 11 and 12 perform different types of voice recognition is assumed to be, for example, a configuration where both of the dictionaries and the algorithms (recognition methods) are different between the first and second voice recognition units 11 and 12, or a configuration where one of the dictionaries and the algorithms (recognition methods) are different between the first and second voice recognition units 11 and 12.

The temporary dictionary storage unit 13a and the third voice recognition engine 13b of the third voice recognition unit 13 will be described in detail below.

The control unit 14 includes the recognition result evaluating unit 14a and a dictionary registration unit 14b.

The recognition result evaluating unit 14a calculates an index indicating an evaluation of the recognition results (the candidate character strings and the score values) obtained by the first and second voice recognition units 11 and 12, and decides based on the index whether or not to cause the third voice recognition unit 13 to recognize the input voice.

FIGS. 4A to 4F are views for explaining examples of indices according to the first embodiment. In the first embodiment, the recognition result evaluating unit 14a calculates as the above index an order distance indicating a degree of difference in an order of candidate character strings aligned in order of the score values obtained by the first and second voice recognition units 11 and 12.

Figure 4A:
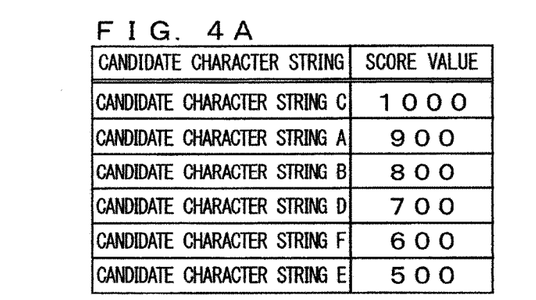
FIGS. 4A to 4F are views for explaining an example of an index according to the first embodiment.
Figure 4B:
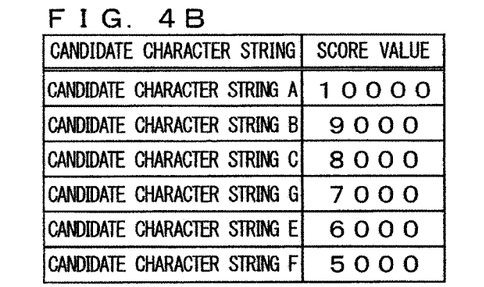

Calculation of the order distance will be described below. FIG. 4A illustrates a state of the example of the recognition result obtained by the first voice recognition unit 11 where candidate character strings are aligned in order of score values. FIG. 4B illustrates a state of the example of a recognition result obtained by the second voice recognition unit 12 where candidate character strings are aligned in order of score values.

Figure 4C:
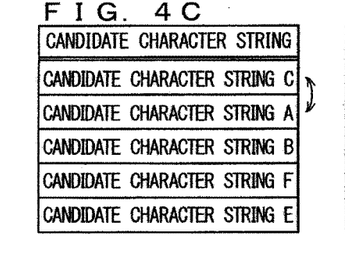

FIG. 4C illustrates candidate character strings A to C, E and F which are aligned in order of scores and common to the candidate character strings obtained by the second voice recognition unit 12 (FIG. 4B) among candidate character strings obtained by the first voice recognition unit 11 (FIG. 4A).

Figure 4D:
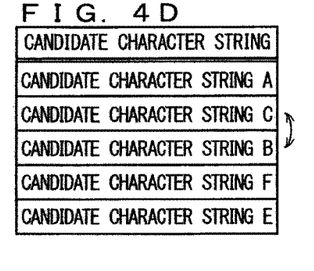
Figure 4E:
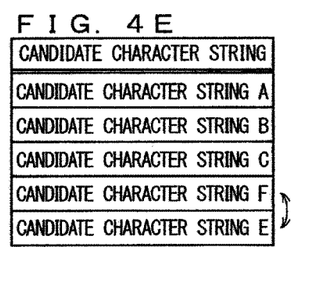
Figure 4F:
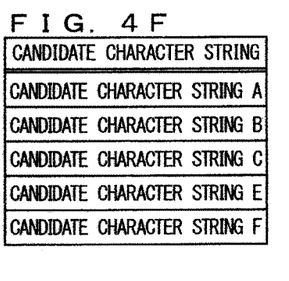

FIG. 4F illustrates the candidate character strings A to C, E and F which are aligned in order of scores and common to the candidate character strings obtained by the first voice recognition unit 11 (FIG. 4A) among the candidate character strings obtained by the second voice recognition unit 12 (FIG. 4B).

FIGS. 4D and 4E illustrate progress in which an order of candidate character strings related to the first voice recognition unit 11 in FIG. 4C is rearranged to match an order of candidate character strings related to the second voice recognition unit 12 in FIG. 4F. More specifically, during first rearrangement for transition from the order in FIG. 4C to the order in FIG. 4D, an order of the candidate character string C and the candidate character string A is switched. During second rearrangement for transition from the order in FIG. 4D to the order in FIG. 4E, an order of the candidate character string C and the candidate character string B is switched. During third rearrangement for transition from the order in FIG. 4E to the order in FIG. 4F, an order of the candidate character string F and the candidate character string E is switched.

The above order distance corresponds to the number of times of order rearrangement, and is "3" in the examples in FIGS. 4C to 4F.

In a case where the recognition results obtained by the first and second voice recognition units 11 and 12 do not completely match to each other and the order distance is not larger than the predetermined threshold (when it is difficult to clearly decide which one is appropriate), the recognition result evaluating unit 14a in FIG. 3 decides to cause the third voice recognition unit 13 to recognize an input voice. In a case other than the above case, the recognition result evaluating unit 14a decides not to cause the third voice recognition unit 13 to recognize an input voice.

When, for example, the threshold used for decision is set to "4", and when the recognition results in FIGS. 4A and 4B are obtained, the recognition results in FIGS. 4A and 4B do not completely match in terms of the order, and the order distance ("3") is not larger than the threshold ("4"). Therefore, the recognition result evaluating unit 14a decides to cause the third voice recognition unit 13 to recognize a voice.

In addition, the threshold used for decision is set based on, for example, setting values (the number of obtainable candidate character strings, i.e., the number of candidate character strings displayed in a list) of the first and second voice recognition engines 11b and 12b and actual measurement values.

When deciding not to cause the third voice recognition unit 13 to recognize an input voice, the recognition result evaluating unit 14a causes the recognition result output unit 15 to output the recognition result obtained by one of the first and second voice recognition units 11 and 12. That is, when it is decided based on the recognition results obtained by the first and second voice recognition units 11 and 12 not to cause the third voice recognition unit 13 to recognize an input voice, the recognition result evaluating unit 14a (control unit 14) causes the recognition result output unit 15 to output the recognition result obtained by one of the first and second voice recognition units 11 and 12.

In addition, which one of the recognition results of the first and second voice recognition units 11 and 12 is to be outputted by the recognition result output unit 15 is set in advance at a stage such as default settings by taking into account reliability (the degree of reliability) based on, for example, a use case and characteristics of a voice recognition engine. Hence, when the recognition results of the first and second voice recognition units 11 and 12 are different to such a degree that the recognition results are not similar, it is not difficult to clearly decide which one of the recognition results of the first and second voice recognition units 11 and 12 is appropriate, and a recognition result of one of the first and second voice recognition units 11 and 12 having higher predetermined reliability is outputted.

When deciding to cause the third voice recognition unit 13 to recognize an input voice, the recognition result evaluating unit 14a outputs the candidate character strings obtained by the first and second voice recognition units 11 and 12, to the dictionary registration unit 14b.

The dictionary registration unit 14b integrates the candidate character strings of the first and second voice recognition units 11 and 12 inputted from the recognition result evaluating unit 14a, and generates a dictionary used for the third voice recognition unit 13. This dictionary is generated when the candidate character strings of the first and second voice recognition units 11 and 12 are inputted from the recognition result evaluating unit 14a, i.e., when the recognition result evaluating unit 14a decides to cause the third voice recognition unit 13 to recognize an input voice.

The dictionary registration unit 14b generates the above dictionary as, for example, the candidate character string list. The dictionary registration unit 14b stores (registers) the generated dictionary in the temporary dictionary storage unit 13a.

The third voice recognition unit 13 includes the temporary dictionary storage unit 13a and the third voice recognition engine 13b as described above.

In the temporary dictionary storage unit 13a, the dictionary generated by the dictionary registration unit 14b is stored. The third voice recognition engine 13b recognizes an input voice stored in the voice storage unit 21 by using the dictionary of the temporary dictionary storage unit 13a to obtain (generate) a recognition result including the candidate character string and the score value corresponding to the input voice, and output the recognition result to the recognition result output unit 15. In the first embodiment, every time the third voice recognition unit 13 recognizes the input voice, the candidate character string used for the recognition is deleted from the temporary dictionary storage unit 13a.

As described above, the second voice recognition unit 12 is configured not to perform the same voice recognition as that of the first voice recognition unit 11. Similarly, the third voice recognition unit 13 is configured not to perform the same voice recognition as those of the first and second voice recognition units 11 and 12. In this regard, in the first embodiment, the dictionary stored in the temporary dictionary storage unit 13a includes both of the candidate character strings obtained by the first and second voice recognition units 11 and 12, and a candidate character string of the dictionary of the third voice recognition unit 13 is not included in one of the dictionaries of the first and second voice recognition units 11 and 12 in some cases. This corresponds to that the dictionary of the third voice recognition unit 13 is substantially different from the respective dictionaries of the first and second voice recognition units 11 and 12. Therefore, the algorithm of the third voice recognition unit 13 may not be necessarily different from the algorithms of the first and second voice recognition units 11 and 12.

The recognition result output unit 15 outputs the recognition result obtained by one of the first to third voice recognition units 11 to 13. The recognition result output unit 15 may output a plurality of candidate character strings sorted to score values similar to the recognition results illustrated in FIG. 2 or may output only a candidate character string of the highest score value.

<Operation>

Figure 5:
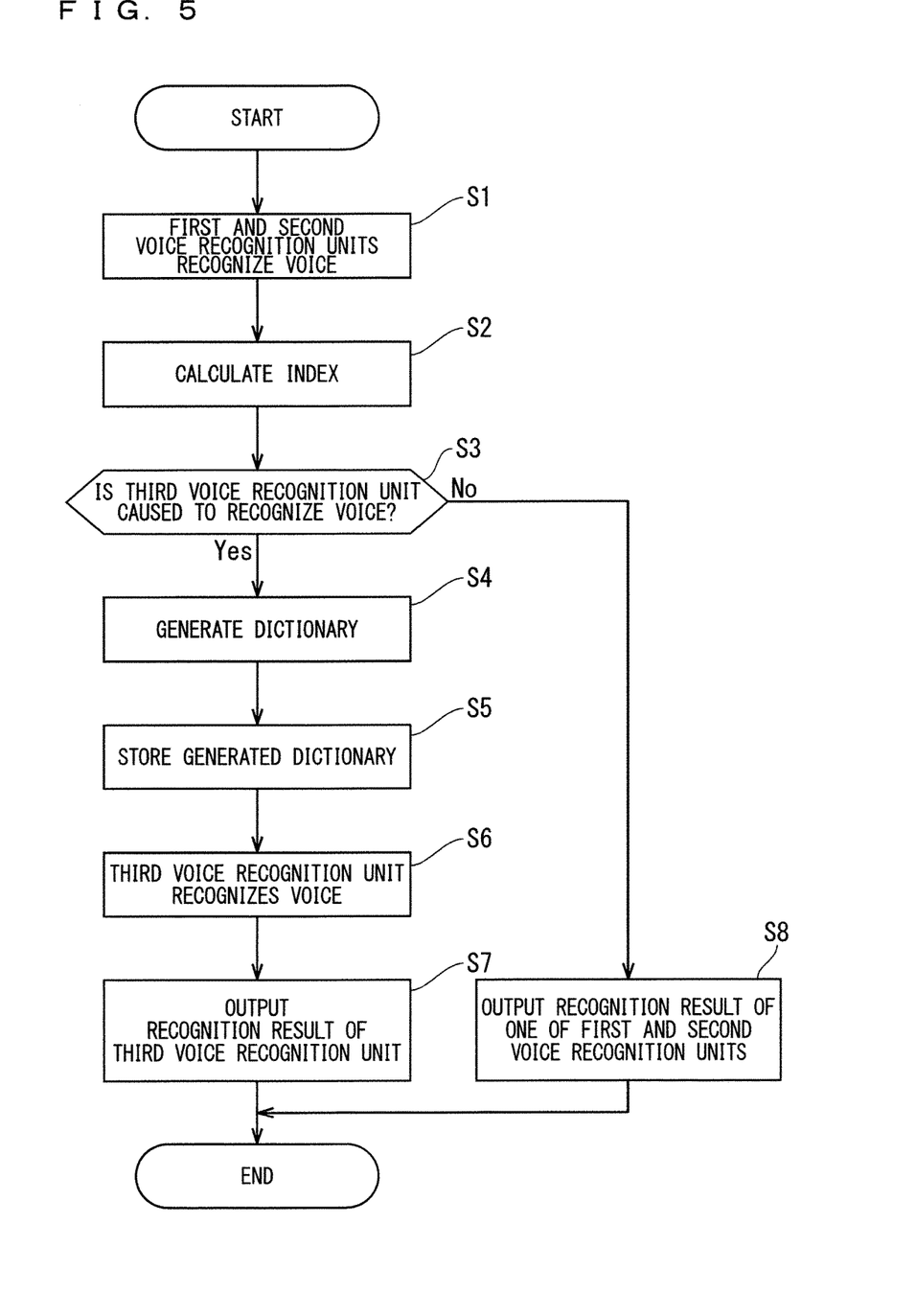
FIG. 5 is a flowchart illustrating an operation of the voice recognition device according to the first embodiment.

FIG. 5 is a flowchart illustrating the operation of the voice recognition device 1 according to the first embodiment.

First, in step S1, the first and second voice recognition units 11 and 12 recognize an input voice.

In step S2, the recognition result evaluating unit 14a calculates an index indicating an evaluation of recognitions results based on the recognition results of the first and second voice recognition units 11 and 12.

In step S3, the recognition result evaluating unit 14a decides based on the calculated index whether or not to cause the third voice recognition unit 13 to recognize an input voice. In the first embodiment, the index is the order distance. Therefore, in a case where the recognition results of the first and second voice recognition units 11 and 12 do not completely match to each other and the order distance is not larger than the predetermined threshold, it is decided to cause the third voice recognition unit 13 to recognize an input voice, and the flow moves to step S4. In a case other than the above case, the flow moves to step S8.

In step S4, the dictionary registration unit 14b generates a dictionary from the candidate character strings obtained by the first and second voice recognition units 11 and 12.

In step S5, the temporary dictionary storage unit 13a stores the dictionary generated in step S4.

In step S6, the third voice recognition unit 13 (third voice recognition engine 13b) recognizes the input voice by using the dictionary stored in the temporary dictionary storage unit 13a. After the third voice recognition unit 13 recognizes the voice, the candidate character strings used for this voice recognition are deleted from the temporary dictionary storage unit 13a.

In step S7, the recognition result output unit 15 outputs the recognition result obtained by the third voice recognition unit 13. Subsequently, the operation illustrated in FIG. 5 is finished.

When the flow moves from step S3 to step S8, the recognition result output unit 15 outputs the recognition result obtained by one of the first and second voice recognition units 11 and 12. Subsequently, the operation illustrated in FIG. 5 is finished.

<Effect>

According to the above voice recognition device 1 according to the first embodiment, when it is decided based on the recognition results obtained by the first and second voice recognition units 11 and 12 to cause the third voice recognition unit 13 to recognize the input voice, the control unit 14 causes the third voice recognition unit 13 to recognize an input voice by using the dictionary including the candidate character strings obtained by the first and second voice recognition units 11 and 12, and causes the recognition result output unit 15 to output the resulting recognition result. Consequently, it is possible to obtain a highly valid recognition result while preventing unnecessary processing.

Further, in the first embodiment, when it is decided based on the recognition results obtained by the first and second voice recognition units 11 and 12 not to cause the third voice recognition unit 13 to recognize an input voice, the control unit 14 causes the recognition result output unit 15 to output the recognition result obtained by one of the first and second voice recognition units 11 and 12. Consequently, when the recognition results of the first and second voice recognition units 11 and 12 are different to such a degree that the recognition results are not similar, and it is not difficult to clearly decide which one of the recognition results is appropriate, it is possible to output appropriate one of the recognition results.

Further, in the first embodiment, whether or not to cause the third voice recognition unit 13 to recognize an input voice is decided based on an index (order distance in this case). Consequently, it is possible to decide whether or not it is difficult to clearly decide which one of the recognition results of the first and second voice recognition units 11 and 12 is appropriate.

Further, in the first embodiment, every time the third voice recognition unit 13 recognizes an input voice, candidate character strings used for recognition are deleted from the temporary dictionary storage unit 13a. Consequently, normally, the third voice recognition unit 13 is released from recognizing an input voice by using candidate character strings having low relevance with the input voice. Consequently, it is possible to enhance an effect of preventing unnecessary processing.

<Modified Example 1>

In the first embodiment, an index used to decide whether or not to cause a third voice recognition unit 13 to recognize an input voice is an order distance. However, the index is not limited to this. In this modified example 1, the above index is maximum score values obtained by first and second voice recognition units 11 and 12. Hereinafter, the maximum score value obtained by the first voice recognition unit 11 will be referred to as a "first maximum score value", and a maximum score value obtained by the second voice recognition unit 12 will be referred to as a "second maximum score value".

In modified example 1, in a case where recognition results of the first and second voice recognition units 11 and 12 do not completely match to each other, and both of the first and second maximum score values obtained by the first and second voice recognition units 11 and 12 are smaller than predetermined first and second thresholds or are larger than the first and second thresholds, a recognition result evaluating unit 14a decides to cause the third voice recognition unit 13 to recognize an input voice. Further, in a case other than the above case, the recognition result evaluating unit 14a decides not to cause the third voice recognition unit 13 to recognize an input voice. In addition, the first threshold is set based on, for example, a setting value (an upper limit value of a score value) and an actual measurement value of a first voice recognition engine 11b. The second threshold is set based on, for example, a setting value (an upper limit value of a score value) and an actual measurement value of a second voice recognition engine 12b.

Figure 6A:
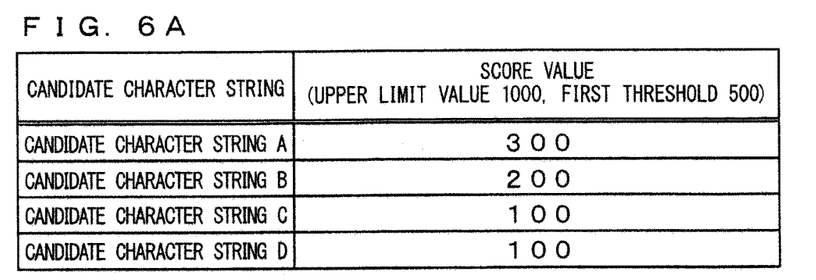
FIGS. 6A and 6B are views for explaining an example of an index according to modified example 1.
Figure 6B:
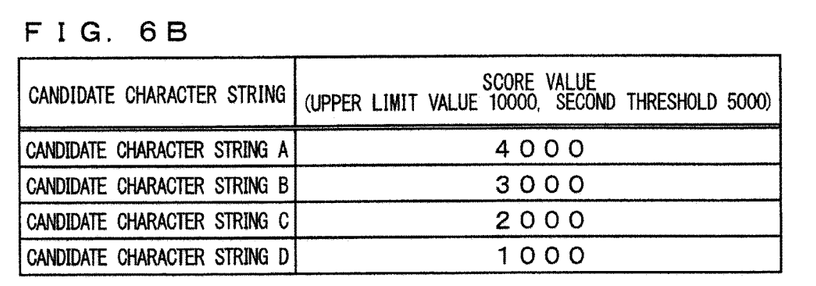

FIGS. 6A and 6B are views for explaining examples of an index according to modified example 1. FIG. 6A illustrates an example of a recognition result obtained by the first voice recognition unit 11. FIG. 6B illustrates an example of a recognition result obtained by the second voice recognition unit 12.

An upper limit value of the score value of the first voice recognition unit 11 is "1000", and "500" which is half of the upper limit value is set as the first threshold. The upper limit value of the score value of the second voice recognition unit 12 is "10000", and "5000" which is half of the upper limit value is set as the second threshold.

In the example in FIG. 6A, the first maximum score value obtained by the first voice recognition unit 11 is "300", and is smaller than the first threshold "500". Further, in the example in FIG. 6B, the second maximum score value obtained by the second voice recognition unit 12 is "4000" and is smaller than the second threshold "5000". Thus, since the recognition results in FIGS. 4A and 4B do not completely match to each other, and the first and second maximum score values are smaller than the first and second thresholds, when the recognition results in FIG. 6A and 6B are obtained, the recognition result evaluating unit 14a decides to cause the third voice recognition unit 13 to recognize a voice.

Similarly, when the recognition results obtained by the first and second voice recognition units 11 and 12 do not completely match to each other, and the first and second maximum score values are larger than the first and second thresholds, too, the recognition result evaluating unit 14a decides to cause the third voice recognition unit 13 to recognize a voice.

Meanwhile, when the first maximum score value is larger than the first threshold and the second maximum score value is smaller than the second threshold, or when the first maximum score value is smaller than the first threshold and the second maximum score value is larger than the second threshold, the recognition result evaluating unit 14a decides not to cause the third voice recognition unit 13 to recognize a voice.

Similarly to the first embodiment, according to above modified example 1, it is possible to decide based on indices (the first and second maximum score values in this case) whether or not to cause the third voice recognition unit 13 to recognize an input voice. Consequently, similarly to the first embodiment, it is possible to decide whether or not it is difficult to clearly decide which recognition result of the first and second voice recognition units 11 and 12 is appropriate.

In addition, only when, for example, the first maximum score value is smaller than the first threshold, the second maximum score value is larger than the second threshold and a third voice recognition engine 13b is different from the second voice recognition engine 12b, the recognition result evaluating unit 14a may decide not to cause the third voice recognition unit 13 to recognize a voice. Similarly, only when, for example, the first maximum score value is larger than the first threshold, the second maximum score value is smaller than the second threshold and a third voice recognition engine 13b is different from the first voice recognition engine 11b, the recognition result evaluating unit 14a may decide not to cause the third voice recognition unit 13 to recognize a voice. With this, it is possible to omit an arithmetic operation which provides the same score calculation criterion.

<Modified Example 2>

In modified example 2, an index to decide whether or not to cause a third voice recognition unit 13 to recognize an input voice is a similarity indicating a degree that candidate character strings obtained by first and second voice recognition units 11 and 12 match to each other.

Further, in modified example 2, a recognition result evaluating unit 14a decides to cause the third voice recognition unit 13 to recognize an input voice in a case where recognition results obtained by the first and second voice recognition units 11 and 12 do not completely match to each other and the similarity is not smaller than a predetermined threshold, and decides not to cause the third voice recognition unit 13 to recognize an input voice in a case other than the above case. In addition, the threshold is set based on, for example, setting values (the number of obtainable candidate character strings, i.e., the number of items which can be displayed in a list) of first and second voice recognition engines 11b and 12b and actual measurement values.

Figure 7A:
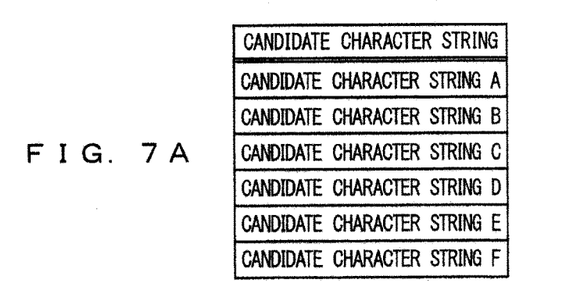
FIGS. 7A and 7B are views for explaining an example of an index according to modified example 2.
Figure 7B:
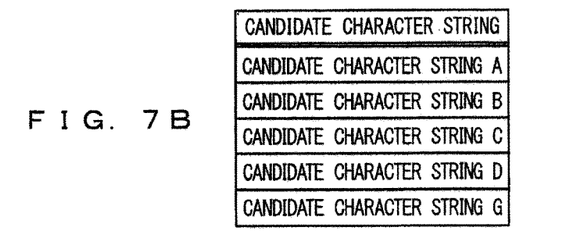

FIGS. 7A and 7B are views for explaining an example of an index according to modified example 2. FIG. 7A illustrates an example of a recognition result obtained by the first voice recognition unit 11. FIG. 7B illustrates an example of a recognition result obtained by the second voice recognition unit 12. As illustrated in FIGS. 7A and 7B, a score value is not indispensable in modified example 2.

First, the recognition result evaluating unit 14a calculates the number of candidate character strings obtained by the first voice recognition unit 11 (referred to as "the first total number of candidates" below), and the number of candidate character strings obtained by the second voice recognition unit 12 (referred to as "the second total number of candidates"). In the example in FIG. 7A, the first total number of candidates is "6", and, in the example in FIG. 7B, the second total number of candidates is "5".

Next, the recognition result evaluating unit 14a calculates the number of common candidate character strings among the candidate character strings obtained by the first and second voice recognition units 11 and 12 (referred to as "the number of common candidates" below). In the examples in FIGS. 7A and 7B, the number of common candidates is the total number of candidate character strings A to D, "4".

The recognition result evaluating unit 14a calculates a similarity by applying the first total number of candidates, the second total number of candidates and the number of common candidates to following equation (1). In the examples in FIGS. 7A and 7B, the similarity is "0.53=(4/6*4/5)".

[Equation 1]

$$\text{Similarity} = \frac{\text{the number of common candidates} \times}{\text{the first total number of candidates} \times} \quad (1)$$
$$\frac{\text{the number of common candidates}}{\text{the second total number of candidates}}$$

When, for example, the threshold is set to "0.25" and the recognition results in FIGS. 7A and 7B are obtained, the recognition results in FIGS. 7A and 7B do not completely match to each other in terms of the number, and the similarity ("0.53") is not smaller than the threshold ("0.25"). Consequently, the recognition result evaluating unit 14a decides to cause the third voice recognition unit 13 to recognize a voice.

Similarly to the first embodiment, according to above modified example 2, it is possible to decide based on the index (the similarity in this case) whether or not to cause the third voice recognition unit 13 to recognize an input voice. Consequently, similarly to the first embodiment, it is possible to decide whether or not it is difficult to clearly decide which recognition result of the first and second voice recognition units 11 and 12 is appropriate.

<Modified Example 3>

In the above description, an index described above is one of an order distance, first and second maximum score values and a similarity. However, the index is not limited to this. The above index only needs to include at least one of the order distance, the first and second maximum score values and the similarity.

For example, following equations (2) to (5) obtained by optionally combining the order distance, the first and second maximum score values and the similarity may be applied to the index. Following equation (2) and following equation (3) have the same property as the similarity, and therefore the same decision as that made for the similarity is performed. Meanwhile, following equation (4) and following equation (5) have the same property as the order distance, and therefore the same decision as that made for the order distance is performed. As is clear from this, the similarity is not limited to that described in modified example 2, and the order distance is not limited to that described in the first embodiment.

[Equation 2]

$$\text{Index} = \frac{\text{the number of common candidates} \times}{\text{the first total number of candidates} \times} \quad (2)$$
$$\frac{\text{the number of common candidates}}{\text{the second total number of candidates} \times}$$
$$\frac{(1 + \text{order distance})}{}$$
$$= \frac{\text{Similarity}}{1 + \text{order distance}}$$

[Equation 3]

$$\text{Index} = \frac{\text{the number of common candidates}}{1 + \text{order distance}} \quad (3)$$

[Equation 4]

$$\text{Index} = \frac{\text{order distance}}{\max\left(\begin{array}{l}\text{the first total number of candidates,} \\ \text{the second total number of candidates}\end{array}\right)} \quad (4)$$

-continued

[Equation 5]

$$\text{Index} = \frac{\text{order distance} \times \text{order distance}}{\text{the first total number of candidates} \times \text{the second total number of candidates}} \quad (5)$$

Similarly to the first embodiment, according to above modified example 3, too, it is possible to decide whether or not it is difficult to clearly decide which one of the recognition results of the first and second voice recognition units 11 and 12 is appropriate.

<Modified Example 4>

In the first embodiment, a dictionary registration unit 14b generates a dictionary to be stored in a temporary dictionary storage unit 13a, from both of candidate character strings obtained by first and second voice recognition units 11 and 12. However, the dictionary registration unit 14b is not limited to this. As modified example 4, the dictionary registration unit 14b may generate a dictionary to be stored in the temporary dictionary storage unit 13a, from candidate character strings obtained by one of the first and second voice recognition units 11 and 12.

In this regard, it is assumed that the dictionary to be stored in the temporary dictionary storage unit 13a is generated only from candidate character strings obtained by the first voice recognition unit 11. According to this configuration, the candidate character strings of the dictionary of a third voice recognition unit 13 are included only in a dictionary of the first voice recognition unit 11 at all times. This corresponds to that the dictionary of the third voice recognition unit 13 is substantially the same as the dictionary of the first voice recognition unit 11. Hence, according to this configuration, an algorithm different from that of the first voice recognition unit 11 is applied to the third voice recognition unit 13 to prevent the third voice recognition unit 13 from performing the completely same voice recognition as that of the first voice recognition unit 11. The algorithm different from that of the first voice recognition unit 11 described herein includes, for example, an algorithm of the second voice recognition unit 12.

Similarly, according to a configuration where the dictionary to be stored in the temporary dictionary storage unit 13a is generated only from candidate character strings obtained by the second voice recognition unit 12, an algorithm different from that of the second voice recognition unit 12 is applied to the third voice recognition unit 13 to prevent the third voice recognition unit 13 from performing the completely same voice recognition as that of the second voice recognition unit 12. The algorithm different from that of the second voice recognition unit 12 described herein includes, for example, an algorithm of the first voice recognition unit 11.

Above-described modified examples 1 to 4 may be applied not only to the first embodiment but also to a second embodiment described below.

<Second Embodiment>

Figure 8:
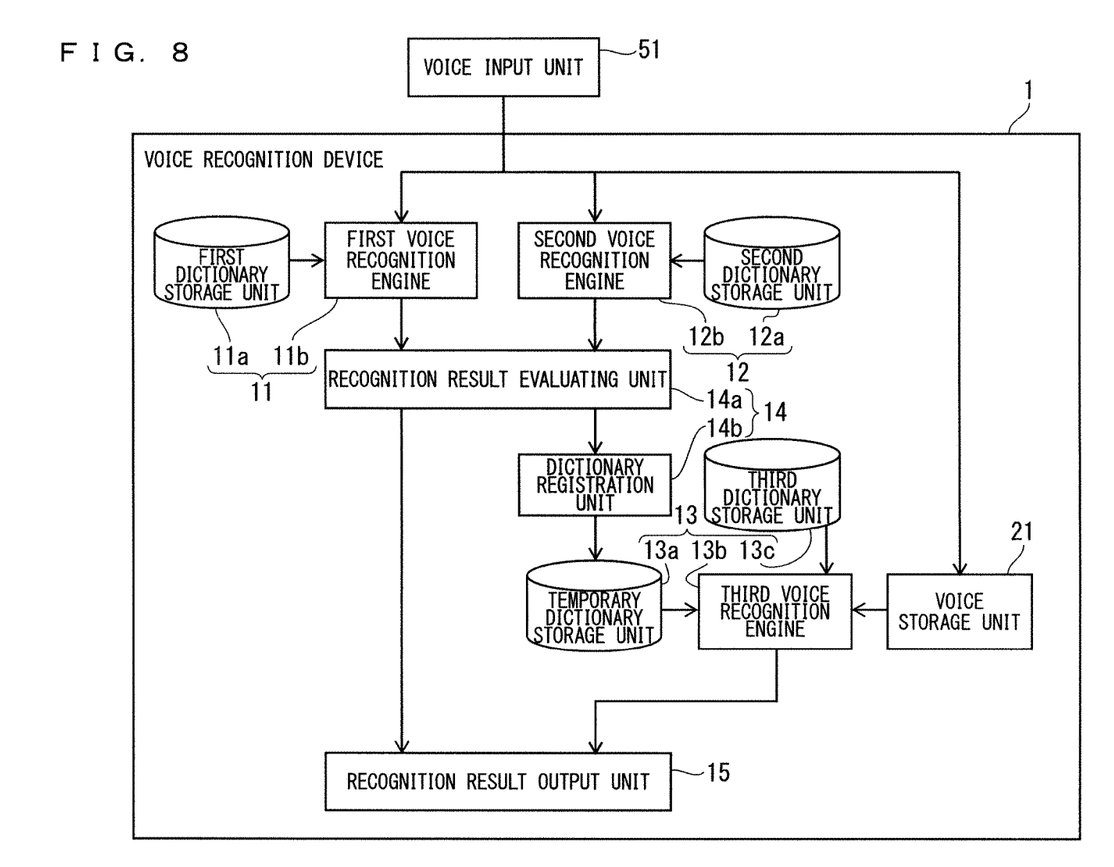
FIG. 8 is a block diagram illustrating a configuration of a voice recognition device according to a second embodiment.

FIG. 8 is a block diagram illustrating a configuration of a voice recognition device 1 according to the second embodiment of the present invention. The same or similar components of the voice recognition device 1 according to the second embodiment as or to those described above will be assigned the same reference numerals, and differences will be mainly described.

The voice recognition device 1 in FIG. 8 includes a third dictionary storage unit 13c in addition to the components of the voice recognition device 1 in FIG. 3. This third dictionary storage unit 13c is included in a third voice recognition unit 13, and stores a dictionary unique to the third voice recognition unit 13. The third voice recognition unit 13 recognizes an input voice by using a dictionary stored in a temporary dictionary storage unit 13a and the dictionary stored in the third dictionary storage unit 13c. That is, the third voice recognition unit 13 recognizes an input voice by using the dictionary unique to the third voice recognition unit 13, too, together with a dictionary including candidate character strings obtained by first and second voice recognition units 11 and 12.

<Effect>

The voice recognition device 1 according to the second embodiment can cause the dictionary of the third dictionary storage unit 13c to include vocabularies which are hardly recognized by the first and second voice recognition units 11 and 12 when it is predicted there are such vocabularies, and thus can enhance an effect of providing a highly valid recognition result.

<Other Modified Example>

Figure 9:
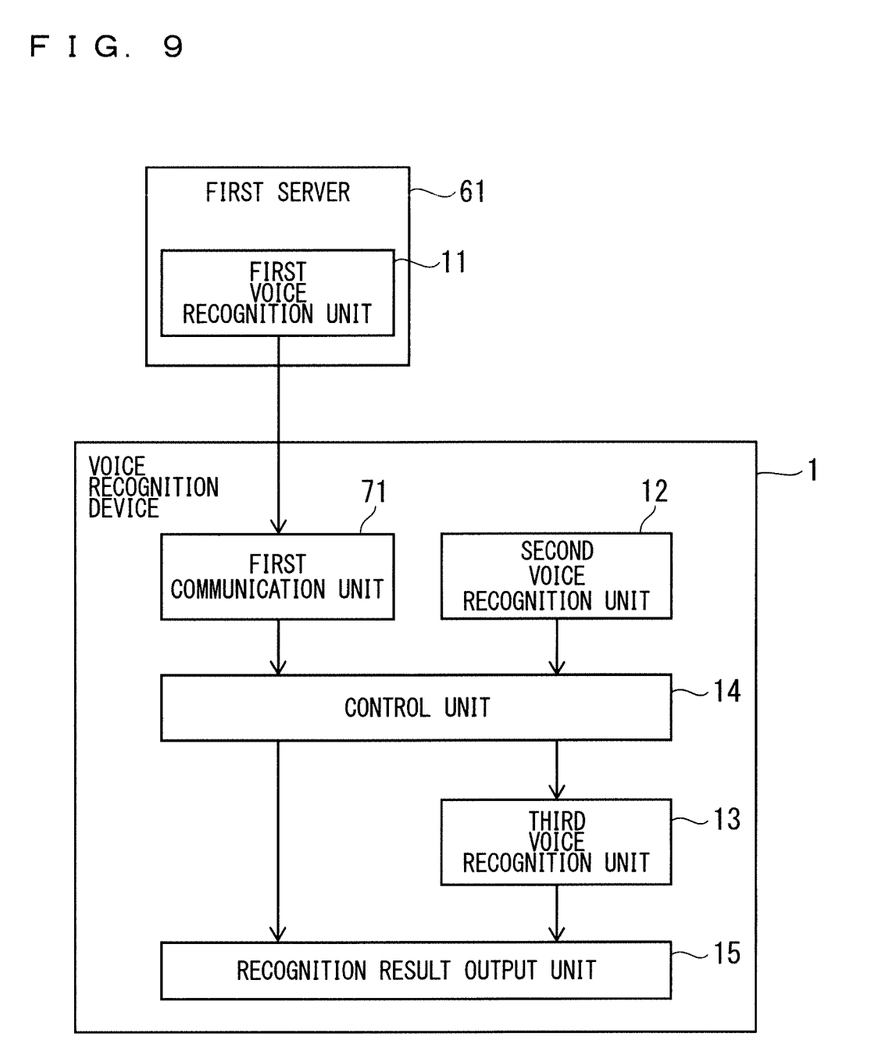
FIG. 9 is a block diagram illustrating main components of a voice recognition system according to another modified example.

FIG. 9 is a block diagram illustrating main components of a voice recognition device 1 according to this modified example. As illustrated in FIG. 9, a first voice recognition unit 11 may be provided to a first server 61, and a first communication unit 71 which receives a recognition result obtained by the first voice recognition unit 11 may be provided in the voice recognition device 1. According to this configuration, too, it is possible to provide the same effect as that of the first embodiment.

Figure 10:
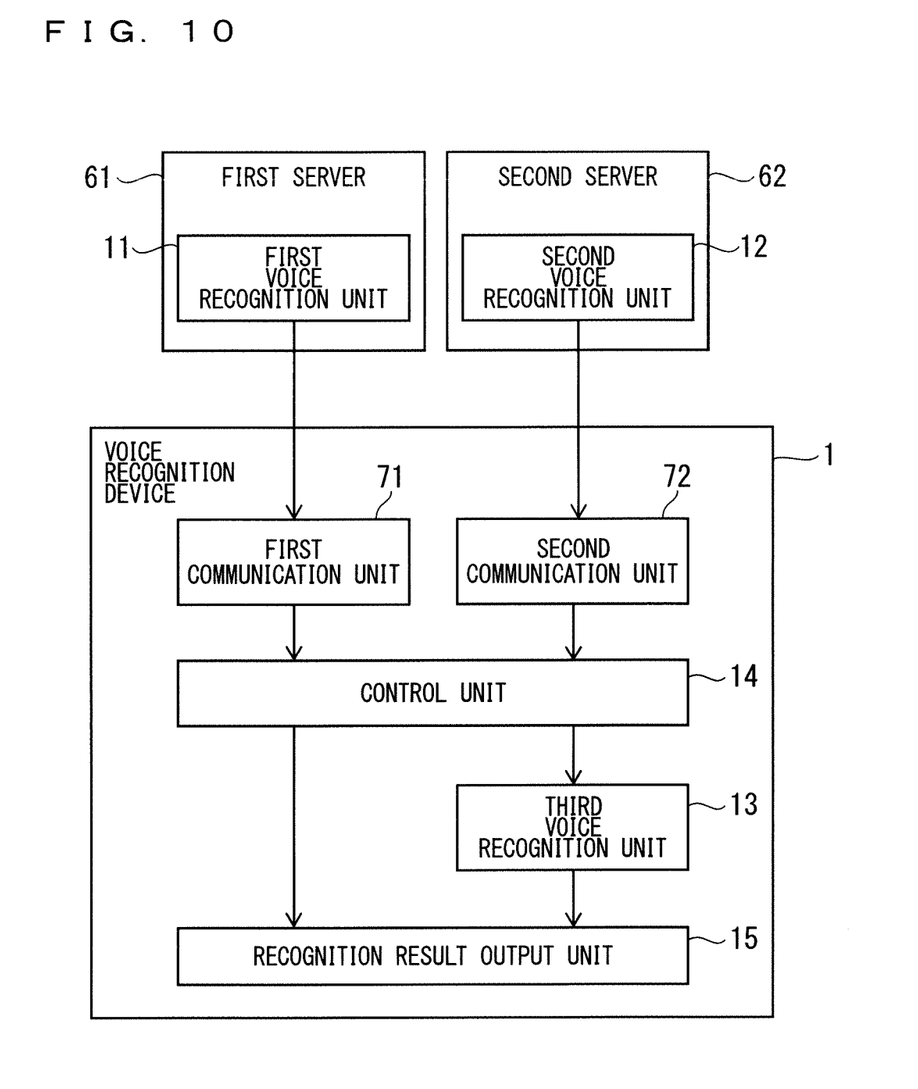
FIG. 10 is a block diagram illustrating main components of a voice recognition system according to another modified example.

FIG. 10 is a block diagram illustrating other main components of the voice recognition device 1 according to this modified example. As illustrated in FIG. 10, first and second voice recognition units 11 and 12 may be provided to first and second servers 61 and 62, and first and second communication units 71 and 72 which receive recognition results obtained by the first and second voice recognition units 11 and 12 may be provided to the voice recognition device 1. According to this configuration, too, it is possible to provide the same effect as that of the first embodiment.

Further, the above-described voice recognition device 1 is applicable to built-in navigation devices, portable navigation devices and communication terminals (e.g. mobile terminals such as mobile telephones, smartphones and tablets) which can be mounted on vehicles, application functions to be installed in these built-in navigation devices, portable navigation devices and communication terminals, and voice recognition systems which are constructed with servers optionally combined as a system, too. In this case, respective functions or respective components of the voice recognition device 1 described above may be dispersed in different devices which compose the system, or may be collectively provided in one of the devices.

According to the present invention, it is possible to freely combine each embodiment and each modified example, or optionally modify and omit each embodiment and each modified example within the scope of the present invention.

The present invention has been described in detail. However, the above description is exemplary in all aspects, and the present invention is not limited to this. It is understood that an infinite number of modified examples which have not been exemplified are assumed without departing from the scope of the present invention.

REFERENCE SIGNS LIST

1: voice recognition device
11: first voice recognition unit

12: second voice recognition unit
13: third voice recognition unit
14: control unit
15: recognition result output unit

The invention claimed is:

1. A voice recognition apparatus which performs recognition of voice to be outputted from an output unit, the voice recognition apparatus comprising:
a processor configured to control:
first, second and third voice recognizers which each recognize an input voice and obtain a recognition result including a candidate character string corresponding to the input voice, each of said first, second and third voice recognizers include a memory that stores a dictionary; and
a controller which, when it is decided based on said recognition result obtained by each of said first and second voice recognizers to cause said third voice recognizer to recognize said input voice, causes said third voice recognizer to recognize said input voice by using the dictionary included in said third voice recognizer including said candidate character string obtained by at least one of said first and second voice recognizers, and causes said output unit to output said recognition result obtained by said third voice recognizer, wherein
the recognition results obtained by each of said first and second voice recognizers further include score values indicating accuracy of said candidate character strings, and
whether or not to cause the third voice recognizer to recognize said input voice is decided based on an index including at least one of said score values which are obtained by said first and second voice recognizers and are a maximum, a similarity indicating a degree that said candidate character strings obtained by said first and second voice recognizers match each other, and an order distance indicating a degree of difference in an order of said candidate character strings aligned in order of said score values obtained by said first and second voice recognizers.

2. The voice recognition apparatus according to claim 1, wherein,
when deciding based on said recognition result obtained by each of said first and second voice recognizers not to cause said third voice recognizer to recognize said input voice,
said controller causes said output unit to output said recognition result obtained by one of said first and second voice recognizers.

3. The voice recognition apparatus according to claim 1, wherein
said third voice recognizer
recognizes said input voice by using a dictionary unique to said third voice recognizer, together with a dictionary including said candidate character string.

4. The voice recognition apparatus according to claim 1, wherein,
in a first case where said recognition result obtained by each of said first and second voice recognizers do not completely match to each other, and said similarity is not smaller than a predetermined threshold, it is decided to cause said third voice recognizer to recognize said input voice, and, in a second case other than the first case, it is decided not to cause said third voice recognizer to recognize said input voice.

5. The voice recognition apparatus according to claim 1, wherein
said index is said similarity, and
in a first case where said recognition results obtained by said first and second voice recognizers do not completely match each other, and said similarity is not smaller than a predetermined threshold, it is decided to cause said third voice recognizer to recognize said input voice, and, in a second case other than the first case, it is decided not to cause said third voice recognizer to recognize said input voice.

6. The voice recognition apparatus according to claim 1, wherein
said index is said order distance, and
in a first case where said recognition results obtained by said first and second voice recognizers do not completely match each other and said order distance is not larger than a predetermined threshold, it is decided to cause said third voice recognizer to recognize said input voice, and, in a second case other than the first case, it is decided not to cause said third voice recognizer to recognize said input voice.

7. The voice recognition apparatus according to claim 1, wherein
said index is said score value which is maximum, and
n a first case where said recognition results obtained by said first and second voice recognizers do not completely match each other, and both of first and second score values which are maximum and are obtained by said first and second voice recognizers are smaller than predetermined first and second thresholds or are larger than said predetermined first and second thresholds, it is decided to cause said third voice recognizer to recognize said input voice, and, in a second case other than the first case, it is decided not to cause said third voice recognizer to recognize said input voice.

8. The voice recognition apparatus according to claim 1, wherein,
every time said third voice recognizer recognizes said input voice, said candidate candidate character string from each of the first and second voice recognizers for the recognition is deleted from said dictionary.

9. A voice recognition method for performing recognition of voice to be outputted from an output unit, the voice recognition method comprising:
when it is decided based on a recognition result obtained by each of first and second voice recognizers among first, second and third voice recognizers which each recognize an input voice and obtain said recognition result including a candidate character string corresponding to the input voice, to cause said third voice recognizer to recognize said input voice, causing said third voice recognizer to recognize said input voice by using a dictionary including said candidate character string obtained by at least one of said first and second voice recognizers, and
causing said output unit to output said recognition result obtained by said third voice recognizer, wherein
the recognition results obtained by each of said first and second voice recognizers include score values indicating accuracy of said candidate character strings, and
whether or not to cause the third voice recognizer to recognize said input voice is decided based on an index including at least one of said score values which are obtained by said first and second voice recognizers and are a maximum, a similarity indicating a degree that said candidate character strings obtained by said first and second voice recognizers match each other, and an order distance indicating a degree of difference in an order of said candidate character strings aligned in order of said score values obtained by said first and second voice recognizers.

* * * * *